United States Patent [19]

Banet

[11] 4,076,024
[45] Feb. 28, 1978

[54] SOLAR RADIATION COLLECTOR

[76] Inventor: Joseph Banet, 112 Uziel Str., Jerusalem, Israel

[21] Appl. No.: 667,430

[22] Filed: Mar. 16, 1976

[51] Int. Cl.² .................................................. F24J 3/02
[52] U.S. Cl. .................................... 126/271; 29/157 R
[58] Field of Search ............... 126/270, 271; 236/1 A; 29/157 R, 157.3 R, 157.3 D

[56] References Cited

U.S. PATENT DOCUMENTS

| 3,889,742 | 6/1975 | Rush et al. | 126/271 |
| 3,995,615 | 12/1976 | Hojnowski | 126/271 |

FOREIGN PATENT DOCUMENTS

| 1,097,233 | 2/1955 | France | 126/271 |

*Primary Examiner*—Kenneth W. Sprague
*Attorney, Agent, or Firm*—Kenneth S. Goldfarb

[57] ABSTRACT

The solar collector is formed with a first plate member and a second plate member in close spatial disposition and seamed along the edges of the plates to form a closed liquid containing planar chamber therebetween, said chamber having an inlet and an outlet port. The first plate member is provided with substantially parallel shallow channels projecting toward the interior of the chamber and the second plate member is provided with a plurality of shallow recesses projecting toward the interior of said chamber. The web portions of said channels and said recesses engage each other whereby longitudinal passages are formed along the inner surface of the first plate and longitudinal and transverse passages are formed along the inner surface of the second plate.

8 Claims, 3 Drawing Figures

SOLAR RADIATION COLLECTOR

Solar radiation collectors, hereinafter referred to as solar collectors, are usually built from a plurality of aligned tubular members or pipes encased in a suitable blackened jacket and the liquid to be heated is passed through said pipes from which pipes said liquid absorbes the collected solar energy.

The solar collector of the present invention is of a simple construction and does not necessitate the more complicated and expensive technology of pipe assembling. Moreover, the present collector provides large surface area with which the liquid to be heated by solar radiation can make contact, resulting in an efficient, low cost solar collector.

These and other advantages of the invention will be more apparent from a consideration of the following illustrative description.

In accordance with the invention there is provided a solar radiation collector comprising a first and a second plate member in close spatial disposition and seamed along their edges to define a closed liquid containing substantially planar chamber threbetween said chamber having an inlet and an outlet port and wherein said first plate member is provided with substantially parallel extending shallow channels projecting toward the interior of said chamber, said second plate member is provided with a plurality of shallow recesses projecting toward the interior of said chamber and wherein web portions of said channels and recesses engage each other, whereby there are formed longitudinal passages along the inner surface of said first plate and longitudinal and transverse passages along the inner surface of said second plate to enable the liquid to be heated by solar energy to flow in a longitudinal direction along the inner surface of said first plate and in a longitudinal and transverse direction along the inner surface of said second plate.

The invention also provides a method for producing a solar radiation collector comprising forming a first plate member with substantially parallel extending shallow channels and a second plate member with a plurality of shallow recesses, disposing said two plate members in spatially parallel relationship so that web portions of said channels and recesses engage each other, seaming said plate members along their edges to form a closed liquid containing substantially planar chamber therebetween, and providing an inlet and an outlet port in said collector whereby liquid to be heated by solar energy is adapted to follow in a longitudinal direction along the inner surface of said first plate and in a longitudinal and transverse direction along the inner surface of said second plate.

While the invention will now be described in connection with certain preferred embodiment in the following illustrative figures, it will be understood that it is not intended to limit the invention to these particular embodiments. On the contrary it is intended to cover all alternatives, modifications and equivalents as may be included within the scope of the invention as defined by the appended claims.

Figure 1:
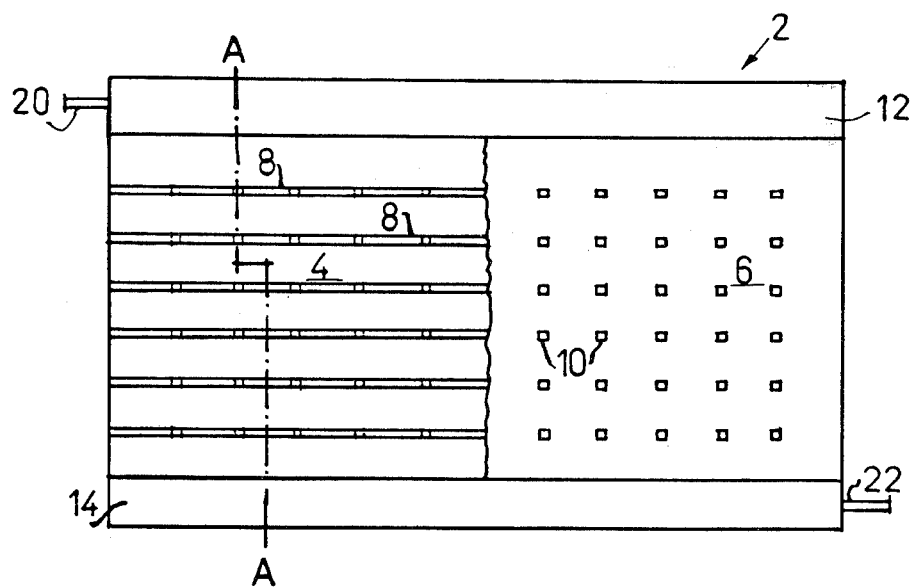
FIG. 1 is a plan view of the collector with the top plate-member partly broken away to show the inner surface of the bottom plate-member.
Figure 2:
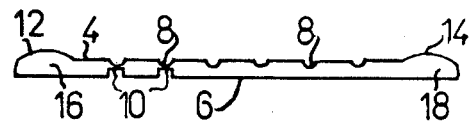
FIG. 2 is a cross-sectional view along line A—A of FIG. 1.
Figure 3:
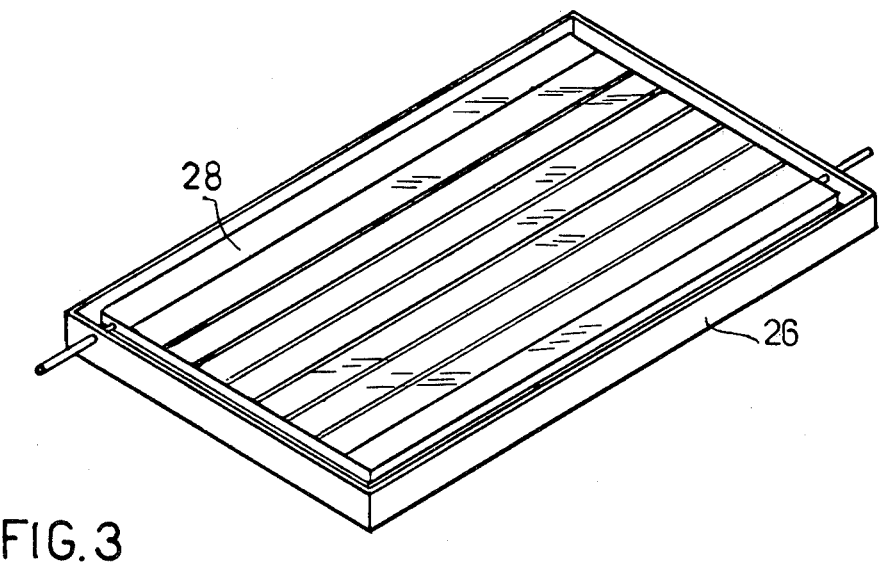
FIG. 3 is a perspective view of the collector placed inside a housing.

Referring to FIGS. 1 and 2, the solar collector 2 comprising two plate-members 4 and 6, preferably made from metal sheets, closely spatially disposed to define therebetween a substantially planar chamber after being seamed along their edges. In platemember 4 there are produced substantially parallel extending shallow channels 8 and in plate-member 6 there are made a plurality of shallow recesses 10 which recesses may be arranged in rows and columns as shown in FIG. 1. The spacing between adjacent channels and recesses in a transverse direction and their disposition relative the edges of the plate-members themselves are such, that when the two members 4 and 6 are superposed in an aligned fashion, the channels 8 and, at least, some of the recesses 10, will be aligned. In a preferred embodiment each channel's width is approximately 6 mm, its depth measured from the major plane of the plate, i.e., from the plane of the non-channeled sections of the plate, is 2–3 mm and the spacing between adjacent channels is 50 mm.

In general the major surface portions of said plate-members can be spaced from each other at a distance of 2–5 mm, the longitudinally extending passages formed between the channels can have a width of about 2 to 8 cm and the depth of each of said shallow channels and recesses measured from the major plane of the respective plate members can be between 1 and 7 mm, however, of course said measurements can be increased or decreased dependent on the overall dimensions of the collector to be produced and other considerations.

The recesses 10, which may have any desired shape, e.g.: square, round, triangular etc., could have substantially the same width, depth and spacing, in the shown vertical direction, as those of the channels, while the spacing in the horizontal direction, between adjacent recesses could be varied. Advantageously, along the two oppositely disposed edges of either or both of plates 4 and 6, there are made troughs 12 and 14 which troughs extend parallelly to the channels 8 and the rows of the recesses 10, so as to project from the major plane of said members in an opposite direction to that of the channels and recesses as seen especially with reference to FIG. 2.

Upon the superpositioning of the two plate-members 4 and 6 with the projected sides of the channels and recesses facing each other, at least some of the web portions of said channels and recesses will engage. After seaming together the edges of said plates, for example by welding and preferably, also spot welding together said web portions, an interior chamber having longitudinal passages along the inner surface of plate 4 and longitudinal as well as transverse passages along the inner surface of plate 6, are formed. In addition, there are also formed along two oppositely disposed edges of the chamber, enlargements or conduits 16 and 18, which are created by the premanufactured troughs 12 and 14. These enlargements, 16 and 18, serving as liquid distributing conduits, are then fitted with inlet and outlet ports 20 and 22 through which the liquid to be heated is circulated.

If desired the end sections of the collector, which include the distributing conduits can be bent into a plane which is substantially normal to the planes of plates 4 and 6 to form a "U-shaped" collector.

The surface of the collector, which is adapted to face the sun is then blackened, if the material from which it is made is not of a dark color, or was not otherwise darkened before, so as to increase its solar radiation absorption capability. The entire collector 2 can be placed on an insulating surface, e.g., an asbestos sheet and introduced in a closed housing 26 having a glass or the like transparent upper surface 28, through which the sun's rays can better penetrate, and for other heat preserving reasons known to the man skilled in the art.

The collector 2 may advantageously be produced from a single plate-member which is channeled and recessed prior to being folded up and seamed to form a substantially planar chamber.

Also, it should be understood that the disposition of the enlarged chamber sections 16 and 18 and the inlet and outlet ports relative the channels and recesses, could be varied. For example, the liquid to be heated could be introduced in a direction normal to the direction of the axis of said channels. Moreover, the overall size and configuration of the collector as well as the relative orientation of the channels and recesses can be changed and is left to be determined by the needs, climate conditions and other given and required conditions.

Such solar collectors can be utilized in all contexts in which solar collectors have been used heretofor and can be efficiently utilized instead of or in conjunction with the present oil or electrical heating systems and for heating home or industrial boilers, by circulating liquid from the collector, where it reheated by the solar energy heat exchange arrangement.

While particular embodiments of the invention have been described and shown in the drawings, it will be evident to those skilled in the art that the present invention may be embodied in other specific forms without departing from the spirit or essential characteristics thereof. For example, the panels may be given any convenient shape or configuration such as curved or circular panels. Also, a plurality of solar collectors, according to the present invention may be assembled into a structure providing solar energy collecting surfaces facing various directions as it is known in the art. Moreover, one or more of these plane or shaped collectors may constitue or be coupled to the surface of at least a portion of a container or shell containing liquid to be heated, whereby said collectors may also be adapted to heat said liquid by direct heat exchange through the walls of the collectors and/or container. The present embodiment are therefore to be considered in all respects as illustrative and not restrictive, the scope of the invention being indicated by the appended claims rather than by the foregoing description, and all changes which come within the meaning and range of equivalency of the claims are therefore intended to be embraced therein.

I claim:

1. A solar radiation collector comprising a first and a second plate member in close spatial disposition and seamed along their edges to define a closed liquid containing substantially planar chamber therebetween, said chamber having an inlet and an outlet port and wherein said first plate member is provided with substantially parallel extending shallow channels projecting toward the interior of said chamber, said second plate member is provided with a plurality of shallow recesses projecting toward the interior of said chamber and wherein web portions of said channels and recesses engage each other whereby there are formed longitudinal passages along the inner surface of said first plate and longitudinal and transverse passages along the inner surface of said second plate to enable the liquid to be heated by solar energy, to flow in a longitudinal direction along the inner surface of said first plate and in a longitudinal transverse direction along the inner surface of said second plate.

2. The solar collector as claimed in claim 1 wherein said recesses are square recesses arranged in spatially disposed rows and columns.

3. The solar collector as claimed in claim 1 wherein said plate members are metal sheet plates.

4. The solar collector as claimed in claim 1 wherein the web portions of said channels and said recesses are welded to each other.

5. The solar collector as claimed in claim 1 wherein the interior space of said chamber adjacent two oppositely disposed edges are enlarged to form conduits which are fitted respectively, with said inlet and outlet ports.

6. The solar collector as claimed in claim 1 wherein at least the upper surface of said collector is blackened, or made of a substantially black material.

7. The solar collector as claimed in claim 1 wherein the collector is placed on an insulating surface and enclosed in a housing having a transparent surface through which solar radiation can impinge upon the upper surface of the collector.

8. The solar collector as claimed in claim 1 wherein said plate members are made of a single channeled and recessed sheet member folded up to form two substantially parallel closely spatially disposed plate members.

* * * * *